March 31, 1970   J. W. WELLS   3,503,601
AXIAL SPRINGS LOADED IN PARALLEL
Filed Oct. 20, 1967
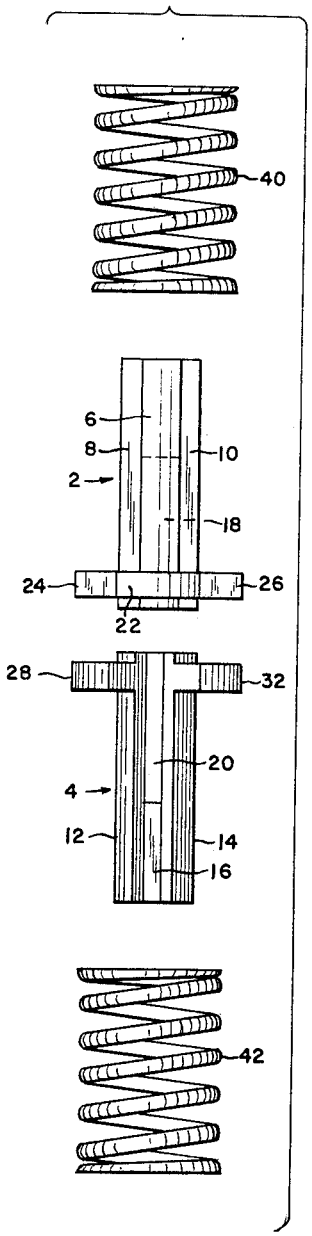
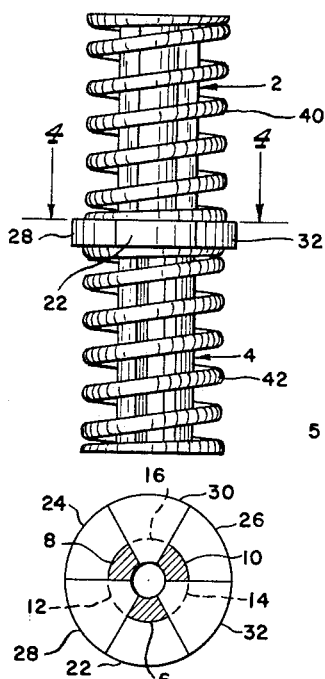
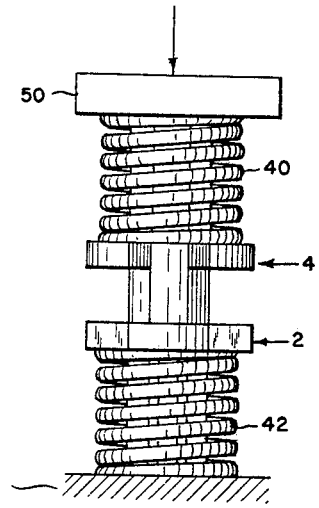
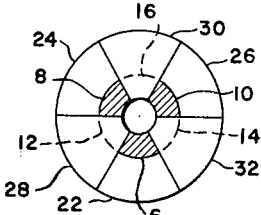
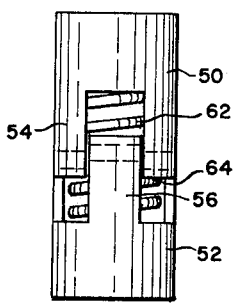
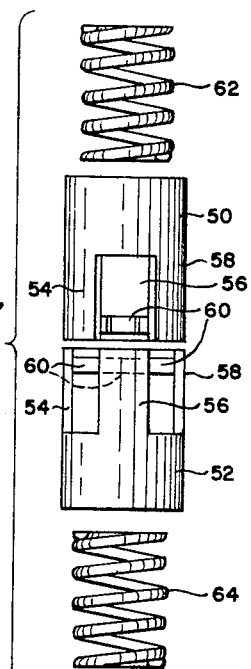
INVENTOR
JOSEPH W. WELLS
BY
Scrivener Parker Scrivener & Clarke
ATTORNEYS United States Patent Office 3,503,601
Patented Mar. 31, 1970

3,503,601
AXIAL SPRINGS LOADED IN PARALLEL
Joseph W. Wells, Bristol, Conn., assignor to Associated Spring Corporation, Bristol, Conn., a corporation of Delaware
Filed Oct. 20, 1967, Ser. No. 676,938
Int. Cl. F16f 3/00
U.S. Cl. 267—1                                    2 Claims

ABSTRACT OF THE DISCLOSURE

A spring assembly comprising two or more helical compression springs arranged in axial alignment, each of which is mounted on a ferrule, the ferrules being oppositely directed and telescopically arranged, whereby all of the springs are simultaneously loaded when a compressive force is applied to the device, thus providing the additive loading of springs arranged in parallel.

SUMMARY OF THE INVENTION

Helical springs of both the compression and extension types are often used in combinations of two or more springs in order to provide desired load effects and results. While the present invention may have utility as applied to extension springs its particular importance and utility are in connection with compression springs and it will be described in this specification as applied to a device comprising a plurality of such springs.

Parallel combinations of springs are designed and calculated on the basis that loads are additive. For parallel operation springs may be arranged side by side, but the number of springs which can be so arranged is restricted by the lateral space available, or one spring may be nested within another, in which case the additional load produced by the inner spring is necessarily small.

In many important uses and application, such for example as die making, it is necessary to substantially increase spring pressure, and the obvious and usual ways to do this are either by increasing the load carrying capacity of the spring or by increasing the number of springs and arranging them in parallel in order to produce additive loads. Both of these methods have definite limitations in practice, those of the second method being described above.

It has therefore been the principal object of the present invention to provide a spring device comprising a plurality of springs which will be operative in parallel to produce additive loads but which will be physically arranged in end-to-end relation thereby obviating the deficiencies of the known parallel arrangements of springs which are described above.

DESCRIPTION OF THE DRAWINGS

FIG. 1 is an exploded view of the parts of a spring device according to the invention;

FIG. 2 is a side elevational view of the assembled parts shown in FIG. 1;

FIG. 3 is a view which is similar to FIG. 2 showing the spring device compressed as it is in use;

FIG. 4 is a sectional view taken on line 4—4 of FIG. 2;

FIG. 5 is an exploded view of a modified form of the invention, and

FIG. 6 is an assembled view of the parts shown in FIG. 5.

DESCRIPTION OF THE INVENTION

A preferred embodiment of the invention is disclosed in FIGS. 1 to 4 and comprises two preferably identical rigid ferrules 2, 4, the first of which has a plurality, three being shown, of relatively elongated legs 6, 8, 10, and the second of which has the same number of elongated legs 12, 14, 16. The legs of each ferrule are parallel and are equidistantly spaced about the periphery of a central body part 18 or 20 to which the legs are integrally united, forming in each case a one-piece ferrule. At its one end each leg is integrally provided with a segment-shaped flange extending outwardly at right angles to the length of the leg, those of ferrule 2 being shown at 22, 24, 26 and those of ferrule 4 being shown at 28, 30, 32. All of these flanges are of the same size and shape and the space between any two adjacent flanges is identical in size and shape to the size and shape of each of the flanges. It will be seen that because of the substantially identical construction and arrangement of the two ferrules they may be placed in end-to-end position, as shown in FIG. 2, with the flanges of each ferrule received within the spaces between the flanges of the other ferrule, all of the flanges being in the same plane as shown in FIG. 2, and with the legs of the two ferrules extending in opposite direction from the common plane of the flanges. In this position and arrangement of parts helical compression springs 40, 42 are placed in surrounding relation to the legs of the ferrules 2, 4 respectively.

In the use and operation of the spring device, it may be placed between two relatively movable members 50, 52 and when force is applied to one of these to move it toward the other the two ferrules will move telescopically with respect to each other, as shown in FIG. 3, with the flanges of each ferrule moving along the legs of the other. This movement will be opposed by the combined force of both springs 40, 42, thus providing the additive loading of springs arranged in axial, end-to-end configuration.

A second form which the invention may take is disclosed in FIGS. 5 and 6, and differs from that described above by having the ferrules in surrounding relation to the springs. In this embodiment there are provided two hollow cylindrical ferrules 50, 52 each of which is provided at its one end with parallel, longitudinally extending circumferentially spaced legs 54, 56, 58 which are of equal length and width, each pair of adjacent legs being separated by openings having the same dimensions as those of the legs. An abutment 60 is provided on the interior wall of each leg of each ferrule adjacent its outer end. Two compression springs 62, 64 complete the spring device and each has such outside diameter that it fits within its associated ferrule with its one end engaging the aligned inner surfaces of the abutments 60 of the ferrule, as shown in FIG. 6. The use and operation of this embodiment of the invention is the same as described above in connection with FIGS. 1 to 4.

In all forms of the invention it is preferred that each compression spring be coextensive in length with the ferrule with which it is associated, whereby additive loading is produced throughout the entire range of deflection of the device.

I caim:

1. A spring device having a plurality of axially aligned springs which produce additive spring loading when a compressive force is applied to the device, comprising two elongated ferrules which are arranged in axial alignment and are constructed and arranged for mutual telescoping movement whereby they may be moved from a free position of maximum extended length to a compressed position in which they overlap, each of said ferrules comprising an elongated part and an abutment at one end thereof, the abutments lying in a common plane and the elongated parts extending in opposite directions therefrom, and a helical compression spring surrounding the elongated part of each of the ferrules with its one end bearing on the abutments, each spring being coextensive in length with the elongated part which it surrounds.

2. A spring device having a plurality of axially aligned springs which produce additive spring loading when a compressive force is applied to the device, comprising two elongated cylindrical ferrules which are arranged in axial alignment and each of which has at its inner end a plurality of longitudinally extending circumferentially spaced legs, the legs of one ferrule being received within the spaces between the legs of the other ferrule whereby the ferrules have mutual telescoping movement and may moved from a free position of maximum extended length to a compressed position in which they overlap, an abutment on the inner surface of each leg adjacent the outer end thereof, and a helical compression spring within each of the ferrules with its one end bearing on the abutment therein and with its other end lying at the inner end of the ferrule.

References Cited
UNITED STATES PATENTS

| | | | |
|---|---|---|---|
| 198,275 | 12/1877 | Chase | 267—70 |
| 1,062,312 | 5/1913 | Watson | 267—1 |
| 1,120,714 | 12/1914 | Hinsdale | 267—1 |

JAMES B. MARBERT, Primary Examiner